United States Patent [19]

Danelia

[11] Patent Number: 5,551,970
[45] Date of Patent: Sep. 3, 1996

[54] DISPERSION STRENGTHENED COPPER

[75] Inventor: Evgeny P. Danelia, Moscow, Russian Federation

[73] Assignee: Otd Products L.L.C., Denver, Colo.

[21] Appl. No.: 107,529

[22] Filed: Aug. 17, 1993

[51] Int. Cl.⁶ .................................................. C22C 29/12
[52] U.S. Cl. ................. 75/235; 75/247; 419/19; 419/23; 419/31
[58] Field of Search .............. 75/235, 247; 419/19, 419/23, 31, 63, 64, 67

[56] References Cited

U.S. PATENT DOCUMENTS

| | | | |
|---|---|---|---|
| Re. 31,902 | 5/1985 | Nadkarni | 75/0.5 BC |
| 3,026,200 | 3/1962 | Gregory | 75/224 |
| 3,179,515 | 4/1965 | Grant et al. | 75/206 |
| 3,525,609 | 8/1970 | Roberts | 75/153 |
| 3,779,714 | 12/1973 | Nadkarni et al. | 29/182.5 |
| 3,785,801 | 1/1974 | Benjamin | 75/0.5 BC |
| 3,787,200 | 1/1974 | Finlay et al. | 75/5 B |
| 4,139,372 | 2/1979 | Danelia et al. | 75/162 |
| 4,315,777 | 2/1982 | Nadkarni et al. | 75/232 |
| 4,478,787 | 10/1984 | Nadkarni et al. | 419/8 |
| 4,594,217 | 6/1986 | Samal | 419/3 |
| 4,857,266 | 8/1989 | Sheinberg et al. | 419/22 |
| 4,999,050 | 3/1991 | Sanchez-Caldera et al. | 75/244 |
| 5,004,498 | 4/1991 | Shimamura et al. | 75/233 |

OTHER PUBLICATIONS

Danelia et al., "Dispersion Strengthened Copper Alloys", (1990).

Rozenberg et al,, "Alloys On The Base Of Copper Strengthened By Dispersed Particles", (1986).

Danelia, "Metalic Materials Strengthened By Ultrafine Oxides", (1991).

Danelia et al., "New Dispersion Strengthened Heat-Resistant Materials on the Base of Copper for Instrument Making", (1981).

Daneliya et al., "Precipitation of Oxide Particles During The Saturation of Copper-Based Multicomponent Solid Solutions by Diffusion of Oxygen", Sov. Phys. Dokl., vol. 26(8), pp. 774–775, (1981).

Daneliya et al., "Precipitation of Particles During Internal Oxidation of Copper–Aluminum–Titanium–Hafnium Alloys", Phys. Met. Metall., vol. 52, No. 4, pp. 104–111 (1981).

Chemical Abstract CA98(12):94062v.

Primary Examiner—Ngoclan Mai
Attorney, Agent, or Firm—Sheridan Ross & McIntosh

[57] ABSTRACT

A dispersion strengthened copper alloy and a method for producing the alloy are provided. The alloy preferably comprises aluminum, titanium and hafnium as alloying elements that are internally oxidized under controlled conditions to produce a dispersion strengthened copper material having good hardness and high conductivity. A method for reducing the adverse effects of hydrogen on such materials is also provided. The dispersion strengthened material can be useful in many applications, including welding electrodes and electrical contacts.

14 Claims, 1 Drawing Sheet

DISPERSION STRENGTHENED COPPER

BACKGROUND OF THE INVENTION

1. Field of the Invention

The present invention relates to copper metal alloy that is dispersion strengthened with stable dispersed oxides and also to a method for making dispersion strengthened copper alloys.

2. Description of Related Art

It is known that the properties of ductile metals can be improved by the distribution of discrete hard phases throughout the metal matrix. Hard particles can be admixed with the metal matrix powder to form a metal having discrete hard phases dispersed therein or internal oxidation can be used to preferentially oxidize certain elements within the metal matrix.

U.S. Pat. No. 3,026,200 by Gregory discloses a method of oxidizing a metal matrix to introduce hard oxide phases into the matrix. A powder of the matrix metal having alloyed therein up to about 5% by weight of a refractory oxide forming metal is heated in an oxidizing atmosphere. The powder is then heated in an inert atmosphere to decompose surface oxides on the matrix metal and provide additional oxygen for diffusion into the powder to convert the alloying element to its oxide.

U.S. Pat. No. 3,179,515 by Grant et al. discloses the internal oxidation of alloy powders in an oxidizing environment with a partial oxygen addition, which is sufficient for the oxidation of the alloying elements of the alloy but is insufficient for the oxidation of the alloy matrix. This method permits substantially full oxidation of the alloying additives, however, it requires precise control of the oxidizing atmosphere parameters.

U.S. Pat. No. 3,525,609 by Roberts discloses a method for internally oxidizing a copper alloy. The copper alloy comprises aluminum which isoxidized to form aluminum oxide particles. The copper alloy also includes a second alloying element that does not substantially oxidize. The non-oxidizing element can include silver, cadmium or zinc.

U.S. Pat. No. 3,779,714 by Nadkarni et al. discloses a method that includes the step of melting an Al—Cu alloy, forming the alloy into a powder having a diameter of less than 300 μm and mixing the alloy powder with an oxidant which consists of copper oxide with additions of aluminum oxide. The mixture of the powders is formed into briquettes and the briquettes are heated to a temperature at which the oxidant is reduced to copper, thereby releasing oxygen. The internal oxidation of the aluminum in the powder of the copper-aluminum alloy then takes place. As a result of the internal oxidation, disperse oxides of $Al_2O_3$ distributed in the bulk of the copper are formed. The alloys, depending on the specific composition, are characterized by a strength equal to 390 MPa to 550 MPa and by a conductivity of from 78% to 92% IACS. (International Annealed Copper Standard—A copper wire 1 meter long weighing 1 gram, having a resistance of 0.15328 ohms at 20° C., has a conductivity of 100% IACS)

However, the distribution of the oxidant in the bulk of the alloy powder in a sufficiently uniform manner is difficult to achieve. In areas with excessive concentration of the oxidant, unrecovered copper oxide is left after the internal oxidation. In areas with an insufficient concentration of the oxidant, the quantity of copper oxide precipitated during dissociation will be less than required for the full internal oxidation of aluminum that is soluted in the alloy. The final product will thus contain areas with unoxidized copper-aluminum solid solution. Both of these phenomena may cause a reduction of the physical and mechanical properties of the product. Further, during the preparation of the oxidant and mixing with the alloy, the contamination of the powder by the mill material and by the milled substances can occur.

U.S. Pat. No. 4,315,770 by Nadkarni (reissued as U.S. Pat. No. 31,902 on May 28, 1985) discloses a process for dispersion strengthening alloy particles by internal oxidation wherein the oxide surface film is eliminated from the surface of the matrix metal. It is disclosed that the elimination of the oxide film enhances the oxidation of the solute elements. Oxidation is carried out according to U.S. Pat. No. 3,779,714.

U.S. Pat. No. 4,315,777 by Nadkarni et al. is directed to a process for dispersion strengthening metal by internal oxidation wherein a coherent mass of alloy and oxidant is formed, such as by pressing, and is thereafter internally oxidized to oxidize the alloying elements. It is disclosed that such a method is advantageous in that it takes less force to form a blend of alloy powder and oxidant into a cohesive mass of a given percentage of theoretical density than to form dispersion strengthened metal of the same net composition into the same shape of the same density.

U.S. Pat. No. 5,004,498 by Shimamura et al. is directed to a method for dispersion strengthening a copper alloy. The raw material for the copper matrix is finely dispersed copper oxide which is dispersed with an oxide forming element such as aluminum. The mix is pulverized and heated in a reducing atmosphere to reduce the copper oxide to copper metal and oxidize the aluminum to aluminum oxide.

SUMMARY OF THE INVENTION

The present invention is directed to a dispersion strengthened material, comprising a copper metal matrix and disperse oxides of aluminum oxide, titanium oxide and hafnium oxide dispersed throughout the copper metal matrix. Preferably, the disperse oxides have an average particle size of about 10 nanometers or less and the disperse oxides comprise not more than about 5 volume percent in relation to the copper metal matrix.

In one preferred embodiment, the mass ratio of aluminum to hafnium to titanium is about 4:1:1. In another embodiment, the material comprises from about 0.05 weight percent to about 0.8 weight percent elemental aluminum, from about 0.01 weight percent to about 0.2 weight percent elemental titanium, and from about 0.01 weight percent to about 0.2 weight percent elemental hafnium in relation to the copper metal matrix. Preferably, the material includes less than about 0.15 weight percent elemental titanium and less than about 0.15 weight percent elemental hafnium.

The dispersion strengthened material according to the present invention has improved mechanical and electrical properties. In one embodiment, the material has a conductivity of at least about 80 percent IACS. In another embodiment, the material has a hardness of not less than about 80 $HR_B$ (Rockwell "B" hardness). In yet another embodiment, the material has a tensile strength of not less than about 550 MPa. The material can have a combination of advantageous properties and in one embodiment, the material has a hardness of at least about 70 $HR_B$ and an electrical conductivity of not less than about 90 percent IACS. In another embodiment, the material has a tensile strength of at least about 500 MPa and an electrical conductivity of not less than about 90 percent IACS.

In one preferred embodiment, a dispersion strengthened material consists essentially of a copper metal matrix and disperse metal oxides, wherein the material has a conductivity of at least about 80 percent IACS and a hardness of at least about 70 $HR_B$. More preferably, the disperse metal oxides consist essentially of aluminum oxide, titanium oxide and hafnium oxide.

The present invention is also directed to a method for producing a dispersion strengthened material, comprising the steps of forming an alloy comprising aluminum, titanium and hafnium, the balance being copper, forming the alloy into particles, oxidizing the particles to form an oxide skin on the surface of the particles, internally oxidizing the particles to form a copper matrix material comprising oxides of aluminum, titanium and hafnium and extruding the copper matrix material using a drawing coefficient of at least about 12 to form a dispersion strengthened material. Preferably, the alloy comprises from about 0.05 weight percent to about 0.8 weight percent aluminum, from about 0.01 weight percent to about 0.2 weight percent titanium and from about 0.01 weight percent to about 0.2 weight percent hafnium. In one embodiment, the internal oxidation step is controlled such that a portion of the aluminum, titanium and hafnium are unoxidized to improve the resistance to hydrogen embrittlement of the dispersion strengthened material.

The present invention is also directed to a method for producing a dispersion strengthened article, comprising the steps of providing copper alloy particles, the copper alloy comprising alloying elements capable of oxidizing to form disperse oxides, and oxidizing the copper alloy particles for a first predetermined amount of time to form a layer of copper oxide on the copper alloy particles, the first predetermined amount of time depending on at least one factor selected from the required degree of oxidation, the shape of the particles, the copper alloy density, the particle size, the concentration of alloying elements and the temperature. The copper alloy is then internally oxidized for a second predetermined amount of time, the second predetermined amount of time depending on at least one of the required degree of oxidation, the shape of the particles, the particle size, the metal to oxygen ratio in the stable oxide of the alloying elements, the atomic fraction of alloying elements and the oxygen penetration in copper. The copper alloy is then extruded to form a dispersion strengthened article.

In one embodiment, the steps of oxidizing and internally oxidizing are controlled such that a first portion of the alloying elements are oxidized and a second portion of the alloying elements are unoxidized to increase the resistance to hydrogen embrittlement of the dispersion strengthened article. Preferably, the first portion is larger than said second portion and more preferably at least about 10 percent of the alloying elements are unoxidized. In this embodiment, the predetermined amount of time can depend on the required degree of oxidation.

DESCRIPTION OF THE INVENTION

Figure 1:
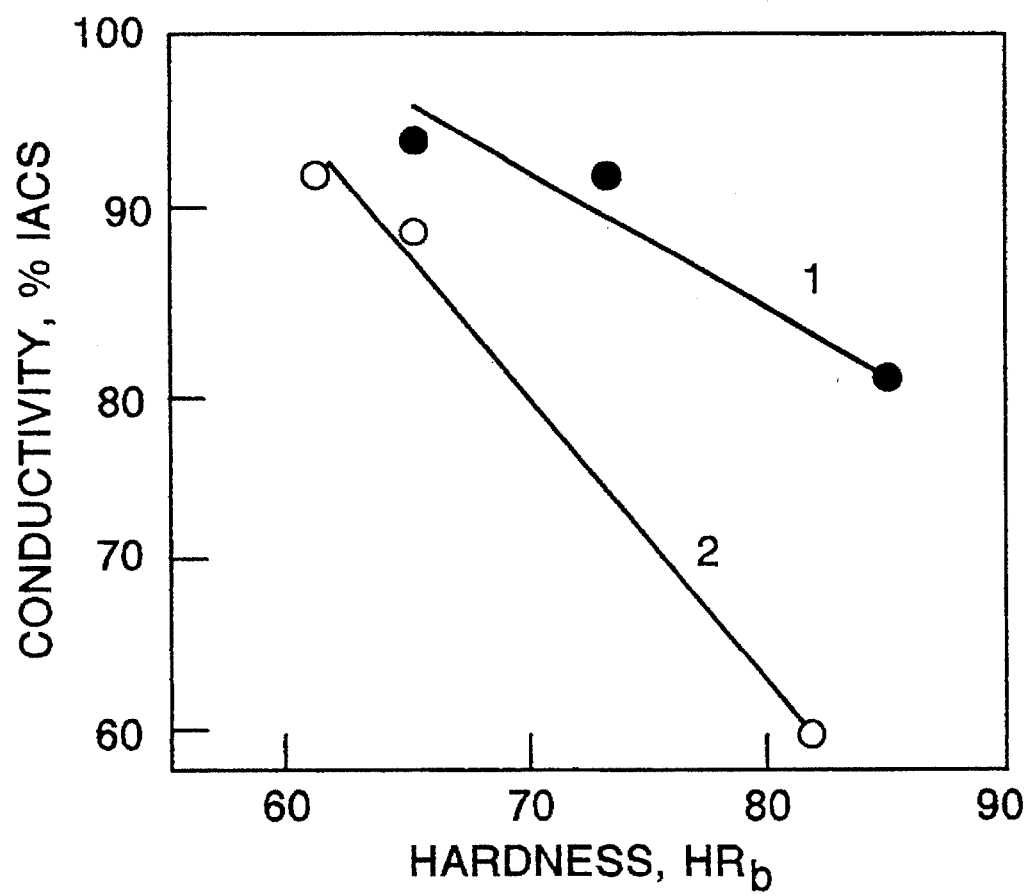
FIG. 1 illustrates the relationship between hardness and electrical conductivity for dispersion strengthened alloy according to the present invention and compared to the prior art.

The present invention is directed to a method that includes the steps of forming a copper alloy having alloying elements capable of being oxidized and oxidizing the alloy using particular oxidation parameters to provide a final product with disperse oxide particles that preferably have an average size of about 10 nm or less. The oxide particles are uniformly distributed in the bulk of the matrix metal, which gives the metal improved mechanical and electrical properties over non-strengthened copper and over prior art dispersion strengthened materials.

According to the present invention, the copper alloy includes at least one, preferably two, and more preferably at least three alloying elements capable of being oxidized to form oxide particles within the copper metal matrix. In the preferred embodiment, the copper alloy comprises aluminum, hafnium and titanium as alloying elements. A similar copper based-alloy is described in U.S. Pat. No. 4,139,372 by Danelia et al., which is incorporated herein by reference in its entirety.

According to this embodiment, the aluminum is preferably present in an amount from about 0.05 weight percent to about 0.8 weight percent and more preferably comprises less than about 0.6 weight percent of the alloy. The titanium is preferably present in an amount from about 0.01 weight percent to about 0.20 weight percent and more preferably comprises less than about 0.15 weight percent of the alloy. The hafnium is preferably present in an amount from about 0.01 weight percent to about 0.20 weight percent and more preferably comprises less than about 0.15 weight percent of the alloy. The balance of the alloy is essentially copper. In a most preferred embodiment, the weight ratio of Al:Hf:Ti is about 4:1:1 and the total concentration of the alloying elements preferably does not exceed about 0.9 weight percent. It is believed that it is also possible to substitute zirconium for hafnium in the foregoing composition.

The copper alloy can be melted and formed into an ingot, as is well known in the art. According to the present invention, the ingot can then be dispersed into chips having a flake, or platelet, form with a milling machine. According to this embodiment, the chips preferably have a thickness of about 100 micrometers or less and can have a width of, for example, up to about 1 millimeter. Alternatively, the copper alloy can be particulated by spraying molten droplets of the alloy in an inert gas to produce discrete granules. The granules are preferably separated, such as by using a sieve, to remove any granules having a size larger than about 600 micrometers, and more preferably larger than about 300 micrometers.

The flakes or granules (hereinafter collectively referred to as particles) of the alloy are then subjected to surface oxidation to form an oxide skin on the surface of each particle. Preferably, the particles are dispersed on a tray such as a strainless steel tray, to permit substantially free access of the oxidizing environment to the particles. The depth of the particle layer in the tray can be up to about 5 centimeters.

The surface oxidation of the particles preferably takes place at a temperature in the range of from about 250° C. to about 900° C., more preferably in the range of from about 300° C. to about 500° C., in the presence of an oxygen containing environment. For example, the particles can be exposed to air or any other atmosphere having a sufficient oxygen content. Alternatively, over-pressures of oxygen may be useful.

A film of copper oxide is thereby formed on the surface of substantially every particle, which serves as the oxidant for the subsequent internal oxidation of the alloying elements. Since copper oxide is formed on the surface of substantially every particle, a uniform distribution of the oxidant throughout the entire volume of particles is provided and thus the internal oxidation of the alloying elements can also be uniform.

The preferred thickness of the copper oxide film depends on the average shape and the dispersivity of the particles, as well as on the concentration of alloying elements in the alloy. The formula for the calculation of the optimum oxidation time, $t_1$, to give the most advantageous thickness of copper oxide film when heated in air includes all of these factors, as well as the oxidation temperature:

$$t_1 = K_1^2 \cdot K_2 \cdot 7.40 \times 10^3 \left( \rho \cdot R \sum_{i=1}^{n} \left( \frac{O}{M} \right)_i C_i \right)^2 \exp\left( \frac{10172}{T} \right) \quad [\text{Eq. 1}]$$

Where:

$K_1$=0.6 to 1.0 depending on the desired degree of internal oxidation of the alloying elements from 60% to 100%;

$K_2$=1 to 2.25 depending on the general geometrical shape of the powder;

$\rho$=the density of the alloy (g/cm$^2$);

R=the radius of the largest oxidized granules or the thickness of the largest particles with flake shape (cm);

n=number of oxide-forming elements in the alloy;

$\left( \frac{O}{M} \right)_i$

=mole fraction of oxygen in the stable oxide of the ith alloying element;

$C_i$=the concentration of the ith alloying element in the alloy (mass fraction);

T=temperature of oxidation (K)

Typically, the best physical and mechanical properties will be realized when full oxidation of 100 percent of the alloying elements occurs. Therefore, $K_1$ is typically set equal to 1.0. Further, the time $t_1$ is preferably calculated for the particles having the largest size. That is, if granules are sieved through 300 micrometers to remove particles having a diameter greater than about 300 micrometers, then the largest size is about 300 micrometers and R=150 micrometers or 0.015 centimeters. This is necessary in order to provide a suitable thickness of oxide film for substantially all of the particles. $K_2$ is set equal to 1.0 for generally spherical particles and 2.25 for flake shaped particles.

According to one embodiment of the present invention, the particles having an oxidized skin layer are then heated in an inert atmosphere to dissociate oxygen from the copper oxide skin and drive the dissociated oxygen into the bulk of the particles to oxidize at least a portion of the alloying elements.

Preferably, the internal oxidation includes the step of heating the powder in an inert atmosphere at a temperature of from about 850° C. to about 950° C. The inert atmosphere can include argon, nitrogen, or a mixture of carbon dioxide and carbon monoxide. The atmosphere used should include a relatively low partial pressure of oxygen such as about $10^{-17}$ atmospheres. Typically, in lower purity gases, there is enough residual water vapor to maintain such a low partial pressure of oxygen. The low partial pressure of oxygen will maintain the proper oxygen stoichiometry on the outside of the oxide skin on the particles, while the particles internally oxidize from the interface of the particle and the oxide skin layer. That is, oxygen for the internal oxidation of the alloying elements comes from the particle/oxide layer interface and the oxide layer is consumed from the inside toward the outside. If the partial pressure of oxygen is too low, the film may dissociate at the outside and the maximum oxygen level at the metal/oxide interface cannot be maintained. Preferably, the partial pressure of oxygen is therefore from about $10^{-6}$ to $10^{-8}$ atmospheres.

The duration of the internal oxidation process, $t_2$, depends on the shape and the size of the powder particles, on the type and concentration of the alloying elements in the alloy, as well as on the temperature. The preferred time, in seconds, can be calculated from:

$$t_2 = k_1 \cdot k_2 \cdot R^2 \sum_{i=1}^{n} V_i C_i / 6P \quad [\text{Eq. 2}]$$

Where:

$k_m$=the coefficient reflecting the required degree of oxidation desired, as determined from Table I below;

$k_2$=1 for particles of spherical shape, 2 for particles of cylindrical shape and 0.75 for particles of flake shape;

R=the radius of the largest granules or the largest thickness of powders with a flake shape (cm);

$V_i$=the stoichiometric ratio of metal to oxygen in the stable oxide of the ith alloying element;

$C_i$=the atomic fraction of the ith alloying element in the alloy; and $\rho$=the oxygen penetration in copper at the internal oxidation temperature (atomic fraction cm$^2$ s$^{-1}$)

TABLE I

| Required Degree | $k_1$ for the Shape of the Particle | | |
|---|---|---|---|
| of Oxidation | Spherical | Cylindrical | Flake |
| 50% | 0.11 | 0.16 | 0.25 |
| 60% | 0.16 | 0.24 | 0.36 |
| 70% | 0.25 | 0.34 | 0.49 |
| 80% | 0.37 | 0.48 | 0.64 |
| 90% | 0.55 | 0.67 | 0.81 |
| 100% | 1.0 | 1.0 | 1.0 |

The calculation can be made for the largest particles present. Before the expiration of time $t_2$, the alloying elements within the smallest particles will have been saturated with oxygen, there will be an excess of copper oxide film remaining on these small particles. Since residual copper oxide in the bulk of the finished product can substantially degrade the properties of the alloy, it is desirable to remove this excess copper oxide. Further, the presence of the oxide film can hinder the effectiveness of the diffusion welding that takes place during the extrusion process, discussed hereinbelow.

In order to remove the excess layer of copper oxide from the particles of smaller sizes, the powder is heated in a reducing atmosphere such as hydrogen or a mixture of hydrogen and argon. The process can be controlled visually in accordance with the color of the powder and is preferably continued to remove substantially all of the copper oxide. Typically, this process step is carried out at from about 300° C. to about 900° C. for from about 1 to about 3 hours.

The particles so produced will thus comprise a copper matrix strengthened by a dispersion of fine oxides such as aluminum oxide, titanium oxide and hafnium oxide. Preferably, the oxides will have a size of less than about 10 nm as measured by electron microscopy techniques.

The dispersion strengthened particles are then briquetted (e.g., pressed) and are then subjected to hot extrusion. Typically, a briquette is pressed at a pressure of from about 5 to about 6 metric tons per square centimeter. Preferably, the density of the briquette after pressing is at least about 90% or greater.

The briquettes are then extruded, preferably at a temperature of from about 850° C. to about 950° C., during which consolidation and diffusion welding of the particles occurs. Good diffusion welding can advantageously be achieved by extruding the briquette with a drawing coefficient of at least about 12, more preferably at least about 16. That is, the cross sectional area of the briquette is preferably reduced by at least about a factor of 12 during extrusion.

A problem that can effect the utility of some products produced according to the present invention is the susceptibility of the product to "hydrogen embrittlement." Hydrogen embrittlement refers to the formation of bubbles within the product when the product is heated in the presence of hydrogen. This effect is caused by oxygen in the air which can enter the briquette during particle compaction. Upon heating, the oxygen forms copper oxides that remain in the finished product. During heating of the finished product in the presence of $H_2$, hydrogen can diffuse into the product and reduce the copper oxide to copper. The hydrogen then combines with the oxygen and forms water; which expands in volume and creates internal bubbles.

When the resistance of the product to hydrogen embrittlement is important, the pressing of the particles to from a briquette is preferably carried out in vacuum and the particles are sealed in evacuated steel or copper capsules. However, according to the present invention, it is possible to increase the resistance of the material to hydrogen embrittlement without using such elaborate steps. According to this embodiment of the invention, if a portion of the alloying elements which are soluted in the matrix are left in unoxidized form, they can act as a getter for the oxygen. An incompletely oxidized material may be characterized by a somewhat lower level of physical and mechanical properties, but this can be an acceptable compromise. For products used, for example, in electrovacuum devices where high temperature brazing in hydrogen is used, the resistance to hydrogen embrittlement can be very important.

As is discussed hereinabove, incomplete oxidation can be achieved by reducing the time of the surface oxidation or the internal oxidation or both processes together, which is accounted for in the corresponding equations by the coefficient $K_1$ or $k_1$.

The semifinished products produced by the hot extrusion step can optionally be treated by subsequent cold deformation. In such a case, the deformation is preferably to a degree of 40 percent or more, which permits the level of mechanical properties to increase rather substantially. Deformation of a smaller degree does not typically lead to a substantial increase in the mechanical properties. The cold deformation step can include cold rolling on a bar-rolling mill, drawing or forging.

According to an alternative embodiment of the present invention, a simplification of the process and subsequent reduction of the cost of the process can be achieved if the briquetting of the powder is carried out immediately after the surface oxidation of the particles. That is, the particles having an oxide skin are briquetted prior to the internal oxidation of the alloying elements. The internal oxidation is thus carried out when the particles are in briquette form, but prior to extrusion.

This embodiment of the invention is somewhat different from the embodiment described above. For example, the calculation of the preferred surface oxidation time ($t_1$) should be for the particles of average size, as opposed to the largest size. As a result, the copper oxide film on particles having a size larger than the average will be too thin and the copper oxide film on the particles with a size smaller than the average will have a film that is too thick. Both of these factors could potentially reduce the physical properties of the final product by from about 10% to about 15%. However, since the small particles contact the large particles in the briquette, during the heating of the briquette the excessive copper oxides on the small particles will oxidize the alloying elements in the large particles and the net effect will be minimal. In such a case, a narrower particle size distribution is desirable since the quantity of the excessive copper oxides and of the unoxidized volumes of the alloy in the final product will thereby be minimized. Also, the internal oxidation of the briquette can occur in air, as opposed to an inert hydrogen or argon atmosphere.

The relative density of the briquettes before the extrusion should be as high as possible and is preferably at least more than about 90% of the theoretical density. High relative densities will reduce the number of open pores, along which uncontrolled oxidation can take place during heating prior to extrusion. That is, during heating of the briquette prior to extrusion, in the presence of air or other oxygen containing gas, the oxygen may penetrate through the pores and into the bulk of the briquette if the briquette density is less than about 90%. In this case, copper oxides are formed in the bulk of the briquette which hinders the material's ability for cold or hot working, good diffusion welding of powder particles during the following extrusion and, as a result, there is a reduction in the mechanical properties.

According to this embodiment, the briquette is heated at a temperature of from about 850° C. to about 950° C. in an inert atmosphere for a time calculated in accordance with Equation 2. The thus formed briquettes are extruded as discussed above, with a drawing coefficient of at least about 12 and preferably at least about 16.

Products produced according to the present invention are useful in applications where the high conductivity of copper is desirable along with good hardness and strength, particularly at elevated temperatures. Applications include welding electrodes, electrical contacts, heat conductors, and the like.

EXAMPLE 1

The following alloys were melted in an induction vacuum furnace in an atmosphere of argon:

TABLE II

| Alloy | Al* | Ti* | Hf* | Cu |
| --- | --- | --- | --- | --- |
| A | 0.2% | — | — | balance |
| B | 0.4% | — | — | balance |
| C | 0.2% | 0.05% | 0.05% | balance |

*= mass percent

Part of the alloys in the form of ingots were dispersed into chips of flake (platelet) form with a thickness of up to about 100 μm using a milling machine. Another portion of the alloys was sprayed into granules using argon gas, and the granules were sieved to remove particles having diameters greater than about 300 μm. Particles of both types were scattered on trays made of stainless steel to provide substantially free access of the atmosphere to all of the particles. The particles were then annealed in air at a temperature of about 400° C. for a period of time determined using the Equation 1 for each of the alloys, taking into account the shape and the size of the powder. (Table III)

TABLE III

| Sample Number | Alloy | Powder Shape | $K_1$ | $K_2$ | $\rho$ (g/cm$^3$) | R (cm) | $\Sigma$ | T (K) | $t_1$ (sec) |
|---|---|---|---|---|---|---|---|---|---|
| 1 | A | Flake | 1 | 2.25 | 8.95 | 0.01 | 0.0018 | 673 | 1584 |
| 2 | A | Sphere | 1 | 1 | 8.95 | 0.015 | 0.0018 | 673 | 1584 |
| 3 | B | Flake | 1 | 2.25 | 8.94 | 0.01 | 0.0036 | 673 | 6321 |
| 4 | B | Sphere | 1 | 1 | 8.94 | 0.015 | 0.0036 | 673 | 6321 |
| 5 | C | Flake | 1 | 2.25 | 8.95 | 0.01 | 0.0022 | 673 | 2366 |
| 6 | C | Sphere | 0.7 | 1 | 8.95 | 0.015 | 0.0022 | 673 | 1160 |
| 7 | C | Sphere | 1 | 1 | 8.95 | 0.015 | 0.0022 | 673 | 2366 |

The particles were then subjected to internal oxidation in an atmosphere of argon at a temperature of about 900° C. for a time which was determined using Equation 2. (Table IV)

TABLE IV

| Sample Number | Alloy | Powder Shape | $k_1$ | $k_2$ | R (cm) | $\Sigma$ | P | $t_2$ (sec) |
|---|---|---|---|---|---|---|---|---|
| 1 | A | Flake | 1 | 0.75 | 0.01 | 0.0071 | $3.16 \times 10^{-10}$ | 281 |
| 2 | A | Sphere | 1 | 1 | 0.015 | 0.0071 | $3.16 \times 10^{-10}$ | 842 |
| 3 | B | Flake | 1 | 0.75 | 0.01 | 0.0014 | $3.16 \times 10^{-10}$ | 554 |
| 4 | B | Sphere | 1 | 1 | 0.015 | 0.0014 | $3.16 \times 10^{-10}$ | 1661 |
| 5 | C | Flake | 1 | 0.75 | 0.01 | 0.00875 | $3.16 \times 10^{-10}$ | 346 |
| 6 | C | Sphere | 1 | 1 | 0.015 | 0.00875 | $3.16 \times 10^{-10}$ | 1038 |
| 7a | C | Sphere | 1 | 1 | 0.015 | 0.00875 | $3.16 \times 10^{-10}$ | 1038 |
| 7b | C | Sphere | 0.25 | 1 | 0.015 | 0.00875 | $3.16 \times 10^{-10}$ | 260 |
| 7c | C | Sphere | 1 | 1 | 0.015 | 0.00875 | $3.16 \times 10^{-10}$ | 260 |

After internal oxidation the powders were treated in hydrogen at a temperature of about 900° C. for about 1 hour to remove excess copper oxides.

The particles were then pressed to a relative density of from about 92% to about 96% in a die having a diameter of 100 mm. The briquettes were removed from the die and turned on a lathe to reduce the diameter to about 98 mm and then were heated to a temperature of about 950° C. The heated briquettes were extruded into bars with a diameter equal to about 26 mm for a drawing coefficient of about 14.2. The surface of the bars was cleaned to remove excess oxides by etching in a 20% solution of HNO$_3$ and then the bars were subjected to rotational forging with intermediate and final annealing at a temperature of about 900° C. As a result, the bars had a final diameter in the range from 16 mm to 24 mm. The properties of the bars are shown in Table V.

TABLE V

| Sample Number | Alloy | Bar Diameter (mm.) | Cold Deformation (%) | Electrical Conductivity (percent of IACS) | Hardness HR$_B$ (HB) |
|---|---|---|---|---|---|
| 1 | A | 26 | 0 | 90 | 62 (103) |
| 2 | A | 26 | 0 | 90 | 62 (103) |
| 3a | B | 26 | 0 | 87 | 69 (120) |
| 3b | B | 20 | 41 | 85 | 75 (135) |
| 3c | B | 20 | 41* | 85 | 69 (120) |
| 4 | B | 24 | 15 | 85 | 70 (122) |
| 5a | C | 26 | 0 | 92 | 71 (125) |
| 5b | C | 16 | 62 | 90 | 77 (140) |
| 5c | C | 16 | 62* | 91.5 | 72 (127) |
| 6 | C | 26 | 0 | 92 | 65 (110) |
| 7a | C | 26 | 0 | 92 | 71 (125) |
| 7b | C | 26 | 0 | 90 | 64 (107) |
| 7c | C | 20 | 41 | 92 | 76 (137) |

*= plus annealing

After annealing in a hydrogen atmosphere at a temperature of about 1000° C. for one hour, all of the samples, except Example Nos. 6 and 7b, were characterized by the existence of hydrogen embrittlement in the form of swellings on the surface and pores in the bulk of the material. Examples 6 and 7b were both formed with incompletely oxidized alloying elements and thus were less susceptible to hydrogen embrittlement. The samples illustrated by Examples 6 and 7b did have lower mechanical properties than if the samples had been fully oxidized.

EXAMPLE 2

Particles of alloy C (Table II), which were produced by spraying the melt with argon, were subjected to the heat treatment in accordance with the parameters similar to those which were described in Example 1 for Sample Nos. 7 and 7a (Tables III and IV). The particles were then placed in a copper press container with a diameter of about 100 mm in a vacuum of $1 \times 10^{-5}$ atm and the press container was welded shut using an electron beam. The powder in the container was heated in air to a temperature of about 950° C. and extruded into a bar with a diameter equal to about 26 mm. The bar was characterized by a conductivity equal to about 53 m/Ohm mm$^2$ (92% of IACS), a hardness equal to 125 HB and was substantially free from hydrogen embrittlement. This example illustrates an alternative method for obtaining a material that is substantially free of hydrogen embrittlement. Instead of incomplete internal oxidation, a very dense briquette is formed in the preliminary stage, as in Example 1, extrusion in a vacuum press container is used.

EXAMPLE 3

Particles of alloy C with both flake and spherical shapes were produced by a method similar to those which were described in Example 1. The average thickness of the particles with a flake shape was equal to about 80 μm, and the average size of the granules was equal to about 120 μm. Particles having a spherical shape and a size in the range of from about 90 μm to about 140 μm were also extracted. The powders were scattered on trays of stainless steel, forming a layer having a thickness of about 10 mm. To achieve a surface oxidation, this layer was heat treated in air at a temperature in the range of from about 290° C. to about 320° C. for a time $t_1$, which was determined from Equation 1. (Table VI)

TABLE VI

| Sample Number | Powder Shape | Value of Parameters | | | | | | |
|---|---|---|---|---|---|---|---|---|
| | | $K_1$ | $K_2$ | $\rho$ (g/cm³) | r (cm) | Σ | T (K) | $t_1$ (sec) |
| 8 | Flake | 0.7 | 2.25 | 8.95 | 0.008 | 0.0022 | 593 | 5700 |
| 9 | Sphere (<300 μm) | 0.7 | 1 | 8.95 | 0.006 | 0.0022 | 563 | 3555 |
| 10 | Sphere (<300 μm) | 0.9 | 1 | 8.95 | 0.006 | 0.0022 | 563 | 5877 |
| 11 | Sphere (<300 μm) | 1 | 1 | 8.95 | 0.006 | 0.0022 | 563 | 7255 |
| 12 | Sphere (90–140 μm) | 0.9 | 1 | 8.95 | 0.0055 | 0.0022 | 563 | 4938 |
| 13 | Sphere (90–140 μm) | 1 | 1 | 8.95 | 0.0055 | 0.0022 | 563 | 6096 |

The powders were then pressed in a die having a diameter of about 100 mm to a relative density equal to from about 92% to about 96%. The briquettes were then turned on a lathe to a diameter of about 98 mm and then were annealed at a temperature of about 950° C. in air for a time which was determined using Equation 2 (Table VII) to internally oxidize the briquette. The briquettes were then extruded into bars having a diameter equal to about 26 mm.

TABLE VII

| Sample Number | Powder Shape | Value of Parameters | | | | |
|---|---|---|---|---|---|---|
| | | $k_2$ | R (cm) | Σ $V_iC_i$ | P (@ 950° C.) | $t_2$ (sec) |
| 8 | Flake | 0.75 | 0.01 | 0.00875 | 6.31 × 10⁻¹⁰ | 173 |
| 9 | Sphere (<300 μm) | 1 | 0.015 | 0.00875 | 6.31 × 10⁻¹⁰ | 520 |
| 10 | Sphere (<300 μm) | 1 | 0.015 | 0.00875 | 6.31 × 10⁻¹⁰ | 520 |
| 11 | Sphere (<300 μm) | 1 | 0.015 | 0.00875 | 6.31 × 10⁻¹⁰ | 520 |
| 12 | Sphere (90–140 μm) | 1 | 0.007 | 0.00875 | 6.31 × 10⁻¹⁰ | 113 |
| 13 | Sphere (90–140 μm) | 1 | 0.007 | 0.00875 | 6.31 × 10⁻¹⁰ | 113 |

The briquettes were etched in the 20% $HNO_3$ and then rolled on the bar-rolling mill to a diameter of about 20 mm.

TABLE VIII

| Sample Number | Diameter of Bars (mm.) | Cold Deformation (%) | Electrical Conductivity (percent of IACS) | Hardness $HR_B$ (HB) |
|---|---|---|---|---|
| 8 | 20 | 41 | 88 | 64 (107) |
| 9 | 20 | 41 | 88 | 64 (107) |
| 10 | 20 | 41 | 89 | 69 (120) |
| 11 | 20 | 41 | 90.6 | 70 (123) |
| 12 | 20 | 41 | 90 | 71 (125) |
| 13a | 26 | 0 | 91.5 | 70 (122) |
| 13b | 20 | 41 | 90.6 | 75 (135) |
| 13c | 20 | 41* | 91.5 | 71 (125) |

*= plus annealing at 900° C.

After annealing in hydrogen at a temperature of 1000° C. for one hour, the bars which were produced from Example Nos. 11 and 13, were characterized by hydrogen embrittlement in the form of swellings on the surface and pores in the bulk of the material.

EXAMPLE 4

Compositions according to the present invention were compared to compositions produced according to the prior art. The results are illustrated in Table IX. The third example in Table IX has a lower value of conductivity since it contains a higher percentage of oxides (about 3.6 volume percent). However, the value of conductivity is higher than that of the binary alloy containing a comparable amount of oxides (last example).

TABLE IX

| Alloy | Mean Particle Size (μm) | Size of Dispersed Oxides | Properties of Rods After Extrusion | | |
|---|---|---|---|---|---|
| | | | Hardness $HR_B$ (HB) | Electrical Conductivity (% of IACS) | Tensile Strength (MPa) |
| 0.2% Al 0.05% Hf 0.05% Ti | ≦150 | 7.0 | 73 (130) | 92 | 510 |
| 0.2% Al 0.05% Hf 0.05% Ti | ≦100 | 6.0 | 74 (133) | 92 | 515 |
| 0.6% Al 0.15% Hf 0.15% Ti | ≦300 | 9.0 | 85 (160) | 81 | 650 |
| 0.2% Al | ≦150 | 10.0 | 65 (110) | 89 | 440 |
| 0.23% Al | ≦830 | 12.0 | 63 (105) | 87 | 395 |
| 0.77% Al | ≦830 | 17.0 | 82 (153) | 60 | 517 |

EXAMPLE 5

Table X illustrates the properties of rods with a diameter of about 16 mm after extrusion that were formed in accordance with the procedure described in Example 1. FIG. 1 illustrates the comparison between the dispersion strengthened alloys of the present invention and the dispersion strengthened alloys of the prior art. Line 1 in FIG. 1 represents the data from the alloys referred to as Samples 14, 15 and 16 in Table X. Line 2 in FIG. 1 represents the data from the alloys referred to as Samples 17, 18 and 19 in Table X. As is evident from Table X and FIG. 1, the Cu/Al/Ti/Hf alloy provides a unique combination of advantageous strength characteristics and higher conductivity than alloys in the Cu/Al system.

TABLE X

| Sample Number | Alloy | | Tensile Strength (MPa) | Hardness HR_B (HB) | Electrical Conductivity (% of IACS) |
| --- | --- | --- | --- | --- | --- |
| 14 | 0.08 | Al | 430 | 65 (110) | 94 |
|    | 0.03 | Ti |     |          |    |
|    | 0.02 | Hf |     |          |    |
| 15 | 0.2  | Al | 500 | 73 (130) | 92 |
|    | 0.05 | Ti |     |          |    |
|    | 0.05 | Hf |     |          |    |
| 16 | 0.6  | Al | 650 | 85 (160) | 81 |
|    | 0.15 | Ti |     |          |    |
|    | 0.15 | Hf |     |          |    |
| 17 | 0.1  | Al | 360 | 59 (95)  | 92 |
| 18 | 0.2  | Al | 440 | 65 (110) | 89 |
| 19 | 0.77 | Al | 517 | 82 (153) | 60 |

While various embodiments of the present invention have been described in some detail, it is apparent that modifications and adaptations of those embodiments will occur to those skilled in the art. However, it is to be expressly understood that such modifications and adaptations are within the spirit and scope of the present invention.

What is claimed is:

1. A dispersion strengthened material, comprising a copper metal matrix and disperse oxides of aluminum oxide, titanium oxide and hafnium oxide dispersed throughout said copper metal matrix wherein the mass ratio of aluminum to titanium to hafnium is about 4:1:1 and wherein said material is made by a process comprising the steps of:

(a) forming particles from an alloy comprising copper, aluminum, titanium and hafnium, said particles having an average particle size of less than about 300 micrometers;

(b) oxidizing said particles at a first temperature of from about 250° C. to about 900° C.;

(c) internally oxidizing said particles at a second temperature of from about 850° to about 950° C.;

(d) heating said internally oxidized particles at a third temperature of from about 300° C. to about 900° C. to remove an excess oxide layer therefrom;

(e) compressing said particles into a preform;

(f) extruding said preform using a drawing coefficient of at least about 12 to form said dispersion strengthened material.

2. A dispersion strengthened material as recited in claim 1, wherein said disperse oxides have an average particle size of about 10 nanometers or less.

3. A dispersion strengthened material as recited in claim 1, wherein said disperse oxides comprise not more than about 5 volume percent in relation to said copper metal matrix.

4. A dispersion strengthened material as recited in claim 1, wherein said material comprises from about 0.05 weight percent to about 0.8 weight percent elemental aluminum, from about 0.01 weight percent to about 0.2 weight percent elemental titanium, and from about 0.01 weight percent to about 0.2 weight percent elemental hafnium in relation to said copper metal matrix.

5. A dispersion strengthened material as recited in claim 4, wherein said material comprises less than about 0.15 weight percent elemental titanium and less than about 0.15 weight percent elemental hafnium.

6. A dispersion strengthened material as recited in claim 1, wherein said material has a conductivity of at least about 80 percent IACS.

7. A dispersion strengthened material as recited in claim 1, wherein said material has a hardness of not less than about 80 HR_B.

8. A dispersion strengthened material as recited in claim 1, wherein said material has a tensile strength of not less than about 550 MPa.

9. A dispersion strengthened material as recited in claim 1, wherein said material has a hardness of at least about 70 HR_B and an electrical conductivity of not less than about 90 percent IACS.

10. A dispersion strengthened material as recited in claim 1, wherein said material has a tensile strength of at least about 500 MPa and an electrical conductivity of not less than about 90 percent IACS.

11. A dispersion strengthened material, consisting essentially of a copper metal matrix and disperse metal oxides consisting essentially of aluminum oxide, titanium oxide and hafnium oxide, wherein said material has a conductivity of at least about 80 percent IACS and a hardness of at least about 70 HR_B and the ratio of aluminum to titanium to hafnium is about 4:1:1 and wherein said material is made by a process comprising the steps of:

(a) providing copper alloy particles having a size of less than about 309 micrometers, said alloy including hafnium, titanium and aluminum;

(b) oxidizing said copper alloy particles for a first predetermined amount of time to form a layer of copper oxide on said copper alloy particles, said first predetermined amount of time depending on at least one factor selected from the required degree of oxidation, the shape of the particles, the copper alloy density, the particle size, the concentration of alloying elements, and the temperature;

(c) internally oxidizing said copper alloy for a second predetermined amount of time, said second predetermined amount of time depending on at least one of the required degree of oxidation, the shape of the particles, the particle size, the metal to oxygen ratio in the stable oxide of the alloying elements, the atomic fraction of alloying elements and the oxygen penetration in copper; and (d) extruding said copper alloy using a drawing coefficient of at least about 12 to form said dispersion strengthened material.

12. A dispersion strengthened material as recited in claim 11, wherein said disperse metal oxides comprise not more than about 5 volume percent of said material.

13. A dispersion strengthened material as recited in claim 11, wherein said material has a conductivity of at least about 90 percent IACS.

14. A dispersion strengthened material as recited in claim 11, wherein said material has a hardness of at least about 80 HR_B.

* * * * *